INVENTORS
TADAO KOHASHI,
KAZUNOBU TANAKA
NORIO SUZUKI

BY Stevens, Davis, Miller & Mosher

ATTORNEYS

United States Patent Office 3,515,890
Patented June 2, 1970

3,515,890
POWER SUPPLY UNIT
Tadao Kohashi, Yokohama, and Kazunobu Tanaka and Norio Suzuki, Kawasaki-shi, Japan, assignors to Matsushita Electric Industrial Co., Ltd., Osaka, Japan, a corporation of Japan
Filed Oct. 18, 1968, Ser. No. 768,822
Claims priority, application Japan, Oct. 26, 1967, 42/70,056
Int. Cl. H02j 3/02; H02m 7/00; G05f
U.S. Cl. 307—2                          3 Claims

ABSTRACT OF THE DISCLOSURE

A power supply unit having an output transformer for an A.C. power source, capacitors connected between a load and the opposite terminals of the output transformer, a common arm selective connectable with one of intermediate terminals of the output transformer, and rectifier elements connected between the common arm and the load-side terminals of the capacitors in the same polarity with respect to the common arm. The device can apply both an A.C. voltage and a D.C. voltage to a solid-state image intensifier or the like and the magnitude and polarity of the D.C. voltage can freely be adjusted without varying the amplitude of the A.C. voltage.

---

This invention relates to a power supply unit which can supply both an A.C. voltage and a D.C. voltage in superposed relation and in which the magnitude and/or the polarity of the D.C. voltage can be varied as desired. More particularly, this invention relates to a power supply unit of the kind described above which is useful as a power source for an image display device comprising the combination of an electro-luminescent material and a photoconductive material.

An image display device comprises an electroluminescent element and a photoconductive element as its essential components and is based on such an operating principle that an A.C. voltage and a D.C. voltage are applied in superposed relation across these elements so that the waveform of the luminous output delivered from the electroluminescent element in response to the application of the A.C. voltage can be controlled by the superposed D.C. voltage which controls the sensitivity of the photoconductive element or by varying the resistance of the photoconductive element. A power source for driving such an image display device is required to supply both an A.C. voltage and a D.C. voltage in superposed relation and the magnitude and/or the polarity of the D.C. voltage can be varied as desired. In this kind of power source, any variation or fluctuation in the value of the A.C. voltage must be avoided.

However, it has hitherto been difficult to obtain a single power supply which is satisfactorily usable for this purpose and the conventional power supply has been a composite power source which consists of a series connection of an A.C. power source and a D.C. power source adapted to generate a variable D.C. voltage. Thus, the conventional power supply unit of this kind has been expensive and required a complex and troublesome procedure for the operation thereof.

It is therefore a primary object of the present invention to overcome the prior defects described above and to provide a single power supply unit which is satisfactorily usable for the service, which is inexpensive and which can very easily be handled.

In accordance with the present invention, there is provided a power supply unit which comprises an A.C. power source, an output transformer for said A.C. power source, capacitors connected between a load and the opposite terminals of said output transformer, a common arm selectively connectable with one of intermediate terminals of said output transformer, and rectifier elements connected between said common arm and the load-side terminals of said capacitors in the same polarity with respect to said common arm.

Figure 1:
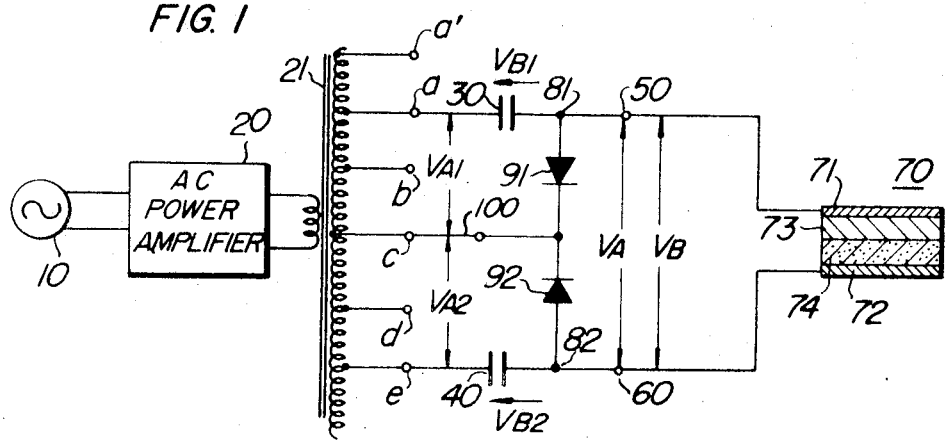
Figure 2:
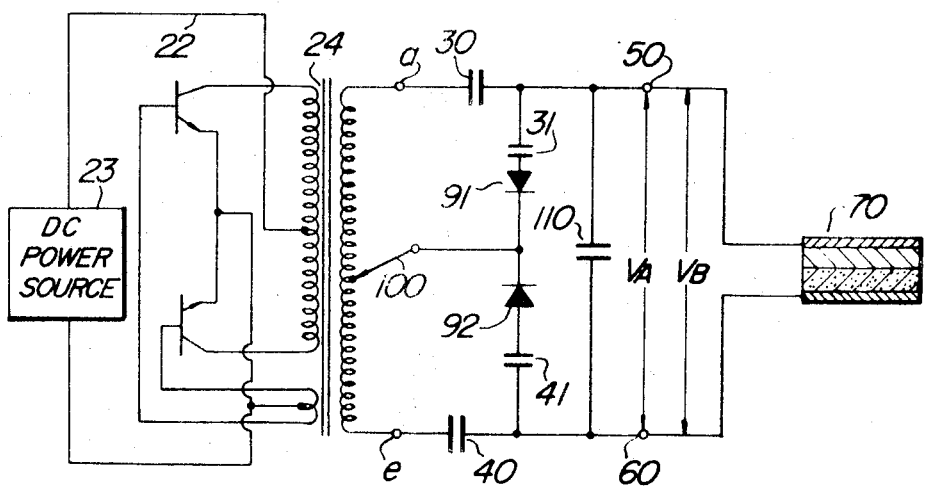

The above and other objects, features and advantages of the present invention will be apparent from the following description taken in conjunction with the accompanying drawings, in which:

FIG. 1 is an electrical connection diagram of an embodiment of the power supply unit according to the present invention; and FIG. 2 is an electrical connection diagram of another embodiment of the present invention.

Referring to FIG. 1, the power supply unit embodying the present invention comprises an oscillator 10, an A.C. power amplifier 20 and an output transformer 21 connected with the power amplifier 20. Opposite terminals $a$ and $c$ of the secondary winding of the output transformer 21 are connected respectively through large-capacity capacitors 30 and 40 and output terminals 50 and 60 with electrodes 71 and 72 of a load or light amplifier 70 so as to apply an A.C. voltage $V_A$ across the light amplifier 70. The light amplifier 70 comprises opposite electrodes 71 and 72, the electrode 72, for example, being pervious to light, and a photoconductive layer 73 and an electroluminescent layer 74 interposed between the electrodes 71 and 72. A common arm 100 is selectively connectable with any one of a plurality of intermediate terminals $b$, $c$ and $d$ disposed between the terminals $a$ and $e$. Rectifier elements such as silicon diodes 91 and 92 are connected between the common arm 100 and points 81 and 82 which are located between the load 70 and the capacitors 30 and 40, respectively. The rectifier elements 91 and 92 are so connected that they have the same polarity with respect to the common arm 100.

In the operating state of the A.C. power amplifier 20, A.C. output voltages $V_{A1}$ and $V_{A2}$ appear across the common arm 100 and the terminal $a$ and across the common arm 100 and the terminal $e$, respectively. These A.C. voltages $V_{A1}$ and $V_{A2}$ are rectified by the rectifier elements 91 and 92 to appear as rectified D.C. voltages $V_{B1}$ and $V_{B2}$ across the capacitors 30 and 40, respectively.

Consider now a D.C. voltage $V_B$ appearing across the output terminals 50 and 60, taking the potential at the terminal 60 as a reference. Then, $V_B = V_{B2} - V_{B1}$. When the common arm 100 is connected with the intermediate terminal $c$ which is equally spaced from the terminals $a$ and $e$, $V_{A1} = V_{A2}$, hence $V_{B1} = V_{B2}$ and $V_B = 0$. Therefore, the A.C. voltage $V_A$ is solely applied across the electrodes 71 and 72 of the light amplifier 70 which is the load, and the D.C. voltage $V_B$ does not appear across the load 70. However, when the common arm 100 is shifted toward the terminal $a$ to be connected now with the intermediate terminal $b$, $V_{A1} < V_{A2}$, hence $V_{B1} < V_{B2}$ and $$V_B = V_{B2} - V_{B1} > 0.$$

Therefore, a D.C. voltage $V_B$ having a positive polarity is applied across the load 70 in superposed relation with the A.C. voltage $V_A$. Needless to say, the sum of $V_{A1}$ and $V_{A2}$ is constant and is approximately equal to $V_A$. Because of the above fact, any variation in the A.C. voltage $V_A$ does not occur despite the appeaarnce of the D.C. voltage $V_B$.

As the common arm 100 is shifted further toward the terminal $a$, the value of the positive D.C. voltage $V_B$ makes an increase until finally it becomes maximum in the state in which the common arm 100 is connected with the terminal $a$. In this state, $V_{A1} = 0$ and the maximum D.C. voltage value depends on the amplification of $V_{A2}$. Even if the common arm 100 is shifted further to a terminal $a'$ beyond the terminal $a$, the above-described maximum value is not exceeded.

When, on the other hand, the common arm 100 is shifted in a direction opposite to the above, or toward the terminal $e$ to be connected with, for example, the intermediate terminal $d$, $V_{A1}>V_{A2}$, hence $V_{B1}>V_{B2}$. Therefore, a D.C. voltage $V_B$ having a negative polarity is now superposed on the A.C. voltage $V_A$. As the common arm 100 is shifted further toward the terminal $e$, the value of the negative D.C. voltage $V_B$ makes an increase until finally it becomes maximum in the state in which the common arm 100 is connected with the terminal $e$. In this state, $V_{A2}=0$ and the maximum D.C. voltage value depends on the amplification of $V_{A1}$. Even if the common arm 100 is shifted further beyond the terminal $e$, the above-described maximum value is not exceeded and remains invariable.

The A.C. voltage $V_A$ is invariable since the capacitors 30 and 40 are fixed to the respective terminals $a$ and $e$. however, the A.C. voltage $V_A$ may be made variable without the need for adjustment of the oscillator 10 and the amplifier 20 when suitable change-over switch means may be provided to shift the connecting position of one of the capacitors 30 and 40 with the output transformer 21.

In lieu of change-over switch means for shifting the connecting positions of the capacitors 30 and 40 and of the common arm 100 as described above, means for slidingly shifting the connecting positions of the above elements may be employed. In order to effectively derive the A.C. voltage $V_A$, the capacity of the capacitors 30 and 40 must be selected to be a suitably large value so as to reduce an undesirable voltage loss. This requirement applied also to another embodiment which will be described later.

In case the power delivered from the A.C. power supply is insufficient, an excessively low impedance of the rectifier circuit would adversely affect the proper operation of the A.C. power supply. Such trouble can be avoided by disposing at least one capacitor, having a capacity smaller than that of the capacitors 30 and 40, between the connection point 81 and the common arm 100, between the connection point 82 and the common arm 100, or in the common arm 100. This additional capacitor may have a variable capacitance so as to add a new effect of varying the D.C. voltage $V_B$.

Referring to FIG. 2, another embodiment of the present invention comprises an A.C. oscillator 22 connected with a D.C. power source 23 for serving as an A.C. power supply. Opposite terminals $a$ and $e$ of the secondary winding of an output transformer 24 are connected respectively through large-capacity capacitors 30 and 40 and output terminals 50 and 60 with a load or light amplifier 70 so as to apply an A.C. voltage $V_A$ across the light amplifier 70 A. common arm 100 is slidable between the terminals $a$ and $e$. Rectifier elements such as silicon diodes and points which are located between the load 70 and the 91 and 92 are connected between the common arm 100 capacitors 30 and 40, respectively. The rectifier elements 91 and 92 are so connected that they have the same polarity with respect to the common arm 100. A capacitor 110 is connected in parallel with the light amplifier 70. In the present embodiment, the inductance of the output transformer 24, the capacitance of the capacitor 110 and the capacitance of the light amplifier 70 form substantially the resonance circuit for the oscillator 22.

Capacitors 31 and 41 of smaller capacity than that of the capacitors 30 and 40 are connected between the capacitor 30 and the rectifier element 91 and between the capacitor 40 and the rectifier element 92, respectively, so as to reduce an undesirable effect that may be imparted to the A.C. circuit. As the common arm 100 is slid between the opposite terminals $a$ and $e$ of the output transformer 24, the magnitude and polarity of a D.C. voltage $V_B$ superposed on the A.C. output voltage $V_A$ generated by the self-oscillation can be adjusted or varied.

It will be understood from the foregoing description that the present invention provides a single power supply unit of very simple structure which can freely adjust the magnitude and polarity of a D.C. voltage to be superposed on an A.C. output voltage without varying the amplitude of the A.C. output voltage.

What is claimed is:

1. A power supply unit comprising an A.C. power source, an output transformer for said A.C. power source, capacitors connected between a load and the opposite terminals of said output transformer, a common arm selectively connectable with one of intermediate terminals of said output transformer, and rectifier elements connected between said common arm and the load-side terminals of said capacitors in the same polarity with respect to said common arm.

2. A power supply unit as claimed in claim 1, in which said output transformer is connected with said A.C. power source through a power amplifier.

3. A power supply unit as claimed in claim 1, in which said output transformer is directly connected with said A.C. power source.

References Cited
UNITED STATES PATENTS

| | | | |
|---|---|---|---|
| 2,164,402 | 7/1939 | Guanella | 307—5 X |
| 3,275,837 | 9/1966 | Codichini et al. | 307—2 |
| 3,337,784 | 8/1967 | Lueder | 307—2 X |

J D MILLER, Primary Examiner

W. H. BEHA, JR., Assistant Examiner

U.S. Cl. X.R.

307—7; 321—47; 323—43.5